(12) United States Patent
Isokangas et al.

(10) Patent No.: US 11,172,511 B2
(45) Date of Patent: Nov. 9, 2021

(54) INFORMATION INDICATION METHOD AND APPARATUS, NETWORK DEVICE AND TERMINAL DEVICE

(71) Applicant: GUANGDONG OPPO MOBILE TELECOMMUNICATIONS CORP., LTD., Guangdong (CN)

(72) Inventors: Jari Jaakko Isokangas, Tampere (FI); Ning Yang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 296 days.

(21) Appl. No.: 16/336,642

(22) PCT Filed: Sep. 14, 2018

(86) PCT No.: PCT/CN2018/105852
§ 371 (c)(1),
(2) Date: Mar. 26, 2019

(87) PCT Pub. No.: WO2019/062566
PCT Pub. Date: Apr. 4, 2019

(65) Prior Publication Data
US 2021/0144768 A1    May 13, 2021

Related U.S. Application Data (60) Provisional application No. 62/563,904, filed on Sep. 27, 2017.

(51) Int. Cl.
H04W 74/08 (2009.01)
H04L 5/00 (2006.01)
H04W 36/00 (2009.01)

(52) U.S. Cl.
CPC ....... *H04W 74/0833* (2013.01); *H04L 5/0048* (2013.01); *H04W 36/0077* (2013.01)

(58) Field of Classification Search
CPC ............ H04L 5/0048; H04W 74/0833; H04W 36/0077
See application file for complete search history.

(56) References Cited

U.S. PATENT DOCUMENTS 9,332,474 B2    5/2016  Sun
10,708,789 B2 *  7/2020  Tsai ................. H04W 74/0833
(Continued)

FOREIGN PATENT DOCUMENTS

CN    104412654 A      3/2015
CN    104956606 A  *  9/2015  ........ H04W 74/0833
(Continued)

OTHER PUBLICATIONS

Huawei et al., Analysis on Conditional Handover, Apr. 3, 2017, 3GPP TSG-RAN WG2 #97bis, Tdoc: R2-1703384 (Year: 2017).*
(Continued)

*Primary Examiner* — Eric Nowlin (57) ABSTRACT

Disclosed are information indication methods and apparatuses, a network device, and a terminal device. In an information indication method, a network device generates first configuration information, and transmits the first configuration information to the terminal device. The first configuration information is adapted to configure a first physical random access channel (PRACH) resource, and includes first indication information indicative of at least one of a target beam or a target cell to be accessed by a terminal device during a random access channel (RACH) procedure initiated with a second PRACH resource.

17 Claims, 4 Drawing Sheets

(56) References Cited

U.S. PATENT DOCUMENTS

| | | | |
|---|---|---|---|
| 10,893,547 B2* | 1/2021 | Lei | H04L 5/0051 |
| 2013/0308473 A1 | 11/2013 | Sun | |
| 2014/0086213 A1 | 3/2014 | Kwon | |
| 2015/0382205 A1 | 12/2015 | Lee et al. | |
| 2017/0251460 A1* | 8/2017 | Agiwal | H04W 72/0406 |
| 2017/0359734 A1 | 12/2017 | Lee et al. | |
| 2017/0367003 A1* | 12/2017 | Zhang | H04W 8/08 |
| 2018/0184304 A1 | 6/2018 | Frenger et al. | |
| 2018/0279136 A1* | 9/2018 | Tsai | H04W 72/046 |
| 2019/0110234 A1 | 4/2019 | Peisa et al. | |
| 2019/0239283 A1* | 8/2019 | Kwak | H04W 74/0833 |
| 2019/0335374 A1* | 10/2019 | Takehana | H04W 24/08 |
| 2019/0387440 A1* | 12/2019 | Yiu | H04W 36/0072 |
| 2020/0162956 A1* | 5/2020 | Cui | H04L 5/0048 |
| 2020/0236716 A1* | 7/2020 | Lei | H04L 5/0094 |
| 2020/0267770 A1* | 8/2020 | Islam | H04W 72/046 |
| 2020/0267776 A1* | 8/2020 | Zhu | H04W 74/08 |
| 2020/0329503 A1* | 10/2020 | Da Silva | H04W 72/02 |
| 2020/0359424 A1* | 11/2020 | Shi | H04B 7/0695 |
| 2020/0373989 A1* | 11/2020 | Yan | H04W 52/42 |
| 2021/0037577 A1* | 2/2021 | Lei | H04W 72/042 |
| 2021/0051546 A1* | 2/2021 | Sayenko | H04L 1/0026 |
| 2021/0144768 A1* | 5/2021 | Isokangas | H04W 74/0833 |

FOREIGN PATENT DOCUMENTS

| | | | |
|---|---|---|---|
| CN | 104956606 A | 9/2015 | |
| CN | 110999392 A * | 4/2020 | H04W 76/27 |
| EP | 3669577 A1 * | 6/2020 | H04W 74/0833 |
| TW | 201831025 A | 8/2018 | |
| WO | 2016209128 A1 | 12/2016 | |
| WO | 2014113686 A2 | 7/2017 | |
| WO | 2018083649 A1 | 5/2018 | |
| WO | 2018113739 A1 | 6/2018 | |
| WO | 2018126756 A1 | 7/2018 | |
| WO | WO-2019024130 A1 * | 2/2019 | H04W 76/27 |
| WO | WO-2019033876 A1 * | 2/2019 | H04W 36/00 |

OTHER PUBLICATIONS

Huawei et al., Allocation of Appropriate RACH Resources for Handover, Jun. 27, 2017, 3GPP TSG-RAN WG2 Adhoc#2 on NR, Tdoc: R2-1706714 (Year: 2017).*
MediaTek Inc., RACH During Handover, Aug. 21, 2017, 3GPP TSG-RAN WG2 Meeting #99, Tdoc: R2-1708048 (Year: 2017).*
Oppo, Further Discussions on Open Issues for RACH Resource Handling and Usage During Handover, Aug. 21, 2017, 3GPP TSG-RAN WG2 Meeting #99, Tdoc: R2-1708366 (Year: 2017).*
Vivo, Clarification on the PRACH Resource Selection of Multiple Beams, Aug. 21, 2017, 3GPP TSG-RAN WG2 Meeting #99, Tdoc: R2-1708503 (Year: 2017).*
Interdigital Inc., RACH Configuration in Handover, Aug. 21, 2017, 3GPP TSG-RAN WG2#99, Tdoc: R2-1708730 (Year: 2017).*
Huawei et al., Multiple Beam Operation in Handover, Aug. 21, 2017, 3GPP TSG-RAN WG2#99, Tdoc: R2-1708874 (Year: 2017).*
Huawei et al., Beam Selection during Handover, Aug. 21, 2017, 3GPP TSG-RAN WG2#99, Tdoc: R2-1708875 (Year: 2017).*
Huawei et al., Allocation of Appropriate RACH Resources for Handover, Aug. 21, 2017, 3GPP TSG-RAN WG2#99, Tdoc: R2-1708883 (Year: 2017).*
Huawei et al., Beam Aspects Related to Random Access Procedure, Aug. 21, 2017, 3GPP TSG-RAN WG2#99, Tdoc: R2-1708971 (Year: 2017).*
Lenovo et al., NR Handover in Multi-Beam Operation, Aug. 21, 2017, 3GPP TSG-RAN WG2 Meeting#99, Tdoc: R2-1708977 (Year: 2017).*
LG Electronics Inc., Random Access Procedure for Multi-Beam Operation, Aug. 21, 2017, 3GPP TSG-RAN2 WG2 Meeting RAN2 #99, Tdoc: R2-1709062 (Year: 2017).*
Qualcomm Incorporated, Beam Aware RACH Procedure and Beam Refinement during Handover, Aug. 21, 2017, 3GPP TSG-RAN WG2 Meeting #99, Tdoc: R2-1709091 (Year: 2017).*
HTC, Discussion on Random Access with Multi-Beam Operations, Aug. 21, 2017, 3GPP TSG-RAN WG2 #99, Tdoc: R2-1709422 (Year: 2017).*
Sony, Remaining Issues in RACH Procedure, Sep. 18, 2017, 3GPP TSG RAN WG1 Meeting AH_NR#3, Tdoc: R1-1716240 (Year: 2017).*
Intel Corporation, NR RACH Procedures, Sep. 18, 2017, 3GPP TSG RAN WG1 Meeting AH_NR#3, Tdoc: R1-1716281 (Year: 2017).*
First Office Action of the Chinese application No. 201880003160.8, dated Nov. 22, 2019.
International Search Report in international application No. PCT/CN2018/105852, dated Nov. 29, 2018.
Written Opinion of the International Search Authority in international application No. PCT/CN2018/105852, dated Nov. 29, 2018.
CMCC; Beam Related Measurement Report and Inter-cell HO in NR; 3GPP TSG-RAN WG2 Meeting #97 R2-1701921; Feb. 17, 2017 (Feb. 17, 2017); the whole document.
Ericsson; Further details of handover execution in NR; 3GPP TSG-RAN WG2 Meeting #97 Tdoc R2-1700863; Feb. 17, 2017 (Feb. 17, 2017); the whole document.
Supplementary European Search Report in the European application No. 18849438.9, dated Jul. 24, 2019.
Oppo: "Further discussion on open issues for RACH resource handling and usage during handover", 3GPP Draft; R2-1708366 Further Discussion On Open Issues for RACH Resource Allocation and Usage During Handover, 3rd Generation Partnership Project (3GPP), Mobile Competence Centre ; 650, Route Des Lu, vol. RAN WG2 , No. Berlin, Germany; Aug. 21, 2017-Aug. 25, 2017 Aug. 20, 2017 (Aug. 20, 2017), XP051318241, Retrieved from the Internet: URL:http://www.3gpp.org/ftp/Meetings_3GPP_SYNC/RAN2/Docs/ [retrieved on Aug. 20, 2017] * Sections 1 and 2 *.
Qualcomm Incorporated: "Beam aware RACH procedure and beam refinement during handover", 3GPP Draft; R2-1709091—Beam Aware RACH Procedure and Beam Refinement During Handover, 3rd Generation Partnership Project (3GPP), Mobile Competence Centre ; 650, Route Des Lucioles ; F-06921 Sophia-An, vol. RAN WG2 , No. Berlin, Germany; Aug. 21, 2017-Aug. 25, 2017 Aug. 20, 2017 (Aug. 20, 2017), XP051318883, Retrieved from the Internet: URL:http://www.3gpp.org/ftp/Meetings_3GPP_SYNC/RAN2/Docs/ [retrieved on Aug. 20, 2017] * Sections 1, 2.1 and 2.2 *.

* cited by examiner

INFORMATION INDICATION METHOD AND APPARATUS, NETWORK DEVICE AND TERMINAL DEVICE

CROSS-REFERENCE TO RELATED APPLICATIONS

The present application claims benefit of U.S. Provisional Application No. 62/563,904, filed on, the contents of which are hereby incorporated by reference in its entirety.

TECHNICAL FIELD

The disclosure relates to the field of mobile communications, and in particular to an information indication method and apparatus, a network device, and a terminal device.

BACKGROUND

It has been agreed in 3GPP RAN2 that UE should prioritize dedicated physical random access channel (PRACH) resources, if configured, over common PRACH resources. However, the radio condition could change quite rapidly, especially in small cell environment due beam sweeping and user equipment (UE) mobility, and UE may not be able to access with any dedicated PRACH resources. When the radio quality of beams with dedicated resources is not good enough for the accessing, the UE needs to use common PRACH resources provided by the network (NW) for accessing via some other beam to target NW node. It would be beneficial if the NW could direct the UE towards preferred beams e.g. for better load balancing between beams/transmission points (TRPs) and also to ensure expected service level from end user point of view. However, the existing system does not provide any means to indicate the UE which beams it should prefer when accessing with common PRACH resources, but provided common resources can be used to access any suitable beam in the target node.

SUMMARY

Embodiments of the disclosure provide an information indication method and apparatus, a network device, and a terminal device.

A first aspect of the disclosure provides an information indication method. The method includes operations performed by a network device of generating first configuration information and transmitting the first configuration information to a terminal device. The first configuration information is adapted to configure a first physical random access channel (PRACH) resource, and includes first indication information indicative of at least one of a target beam or a target cell to be accessed by a terminal device during a random access channel (RACH) procedure initiated with a second PRACH resource.

A second aspect of the disclosure provides an information indication method. The method includes operations performed by a terminal device of receiving first configuration information from a network device and determining at least one of a target beam or a target cell to be accessed during a random access channel (RACH) procedure initiated with a second PRACH resource based on the first indication information. The first configuration information is adapted to configure a first physical random access channel (PRACH) resource, and includes first indication information.

A third aspect of the disclosure provides an information indication apparatus. The apparatus includes a generation unit and a first transmission unit. The generation unit is configured to generate first configuration information. The first configuration information is adapted to configure a first physical random access channel (PRACH) resource, and includes first indication information indicative of at least one of a target beam or a target cell to be accessed by a terminal device during a random access channel (RACH) procedure initiated with a second PRACH resource. The first transmission unit is configured to transmit the first configuration information to the terminal device.

A fourth aspect of the disclosure provides an information indication apparatus. The apparatus includes a first reception unit and a determination unit. The first reception unit is configured to receive first configuration information from a network device. The first configuration information is adapted to configure a first physical random access channel (PRACH) resource, and includes first indication information. The determination unit is configured to determine at least one of a target beam or a target cell to be accessed during a random access channel (RACH) procedure initiated with a second PRACH resource, based on the first indication information.

A fifth aspect of the disclosure provides a network device. The network device includes a processor and a memory storing a computer program. The processor is configured to call and run the computer program stored in the memory to execute the method in the first aspect.

A sixth aspect of the disclosure provides a terminal device. The terminal device includes a processor and a memory storing a computer program. The processor is configured to call and run the computer program stored in the memory to execute the method in the second aspect.

A seventh aspect of the disclosure provides a chip. The chip includes a processor, configured to call and run a computer program stored in a memory, to cause a device in which the chip is installed to execute the method in the first aspect.

An eighth aspect of the disclosure provides a chip. The chip includes a processor, configured to call and run a computer program stored in a memory, to cause a device in which the chip is installed to execute the method in the second aspect.

A ninth aspect of the disclosure provides a computer readable storage medium. The computer readable storage medium has a computer program stored therein and the computer program causes a computer to execute the method in the first aspect.

A tenth aspect of the disclosure provides a computer readable storage medium. The computer readable storage medium has a computer program stored therein and the computer program causes a computer to execute the method in the second aspect.

An eleventh aspect of the disclosure provides a computer program product. The computer program product comprises a computer program which causes a computer to execute the method in the first aspect.

A twelfth aspect of the disclosure provides a computer program product. The computer program product comprises a computer program which causes a computer to execute the method in the second aspect.

A thirteenth aspect of the disclosure provides a computer program. The computer program causes a computer to execute the method in the first aspect.

A fourteenth aspect of the disclosure provides a computer program. The computer program causes a computer to execute the method in the second aspect.

According to the embodiments of the disclosure, the NW capabilities are improved to guide to preferred beams and/or cells during the handover also when common PRACH resources are used for better load balancing between beams and cells. With this proposed mechanism, the dedicated PRACH resources indication solution can also be enhanced to use to guide UEs to preferred beams when accessing with common PRACH resources during intra-NR handover.

Using the same solution to guide UE in case of dedicated and common resources would allow more efficient usage of available signaling resources.

BRIEF DESCRIPTION OF DRAWINGS

In order to describe the technical solutions in the embodiments of the disclosure more clearly, the drawings required to be used in descriptions about the embodiments of the disclosure will be simply introduced below. Obviously, the drawings in the following descriptions are only some embodiments of the disclosure. Those of ordinary skilled in the art may further obtain other drawings according to these drawings without creative work.

DETAILED DESCRIPTION

The following clearly and completely describes the technical solutions in the embodiments of the disclosure with reference to the accompanying drawings in the embodiments of the disclosure. Apparently, the described embodiments are merely a part rather than all of the embodiments of the disclosure. All other embodiments obtained by a person of ordinary skill in the art based on the embodiments of the disclosure without creative efforts shall fall within the protection scope of the disclosure.

The embodiments of the disclosure described below can be applied to various communication systems, for example, the Global System of Mobile communication (GSM) system, the Code Division Multiple Access (CDMA) system, the Wideband Code Division Multiple Access (WCDMA) system, the General Packet Radio Service (GPRS), the Long Term Evolution (LTE) system, LTE Frequency Division Duplex (FDD) system, LTE Time Division Duplex (TDD) system, the Universal Mobile Telecommunication System (UMTS) system, the Worldwide Interoperability for Microwave Access (WiMAX), the 5G system, or the like.

Figure 1:
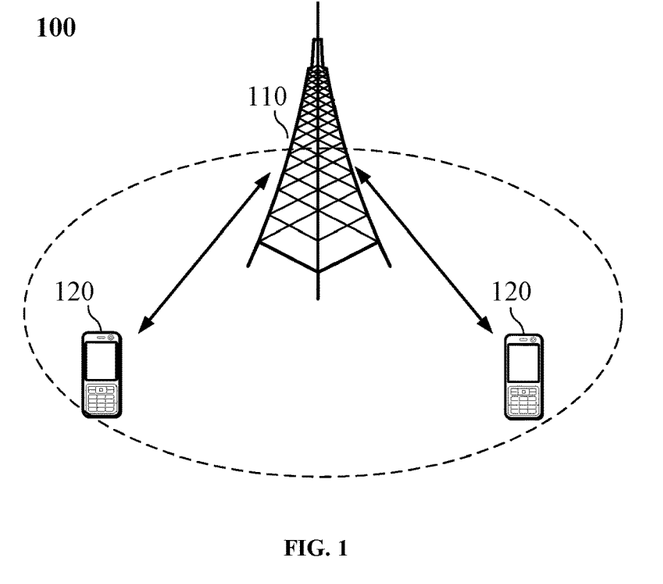
FIG. 1 illustrates a schematic diagram of a communication system 100 applied in an embodiment of the disclosure.

FIG. 1 illustrates a schematic diagram of a communication system 100 applied in an embodiment of the disclosure. The wireless communication system 100 may include at least one network device 110. The access network device 100 may be a device communicating with terminal devices 120 (or called communication terminals, terminals). Each of access network device 100 may provide communication coverage for a specific geographical area, and may communicate with terminal devices within the coverage. The network device 100 may be a Base Transceiver Station (BTS) in a GSM system or a Code Division Multiple Access (CDMA) system, or a NodeB (NB) in a WCDMA system, or an Evolutional Node B (eNB or eNodeB) in an LTE system, or a radio controller in a Cloud Radio Access Network (CRAN). Alternatively, the network device may be a relay station, an access point, a vehicle-mounted device, a wearable device, a core network device in the 5G network, an network device in a future evolved Public Land Mobile Network (PLMN), or the like.

The communication system 100 further includes multiple terminal devices 120 within the coverage of the network equipment 110. The terminal devices 120 may be mobile or stationary. Each of terminal devices 120 may be an access terminal, a User Equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or any other processing device connected to a wireless modem, a vehicle-mounted device, a wearable device, a terminal device in a future 5G network, a terminal device in a future evolved PLMN, or the like.

The terminal devices 120 may communicate with each other through, for example, device to device (D2D) direct connection.

The 5G system or 5G network may be called a new radio (NR) system or an NR network.

FIG. 1 illustrates a network device and two terminal devices. Of course, it should be understood that the communication system 100 may include multiple network devices 110, and a number of terminal devices under coverage of each of the network devices. The number of the network devices and the number of terminal devices are not limited in the embodiments of the disclosure.

The communication system 100 may further include a network controller, a mobile management entity and other network entities, which are not limited here.

As people of ordinary skill in the art can understand, in the embodiments of the disclosure, devices having a communication function in the network/system may be called a terminal device. Taking the communication system 100 as illustrated in FIG. 1 as an example, the terminal device may include the network device 110 and the terminal device 120, each having the communication function. The terminal device may further include other devices in the communication system 100, for example, the network controller, the mobile management entity and other network entities, which are not limited here.

It should be understood that, the terms "system" and "network" in the text can be exchanged. The term "and/or" in the text merely describes associations between associated objects, and it indicates three types of relationships. For example, A and/or B may indicate that A exists alone, A and B coexist, or B exists alone. In addition, the character "/" in the text generally indicates that the associated objects are in an "or" relationship.

For better understanding the technical solutions of the embodiments of the disclosure, the technologies related to the embodiments will be described below.

In the modern cellular systems, like LTE/LTE-A and NR (5G) in the future, handover procedure is used to release the existing radio resources from the current (serving) network node and allocate new radio resources from new (target) network node. Before the UE can start using new radio resources allocated from target NW node, synchronization and random-access procedures are needed. After UE has been synchronized (able to receive and transmit bits between itself and NW node) with target node it can start the random-access procedure towards target cell. Random access (RACH) procedure can be either contention based or contention free depending whether dedicated or common RACH resources are used for the procedure. The Physical RACH (PRACH) resources are identified by time (subframe), frequency and preamble sequence. Common PRACH resource configuration is broadcasted in each cell using system information messages (SIB1 and SIB2) and these broadcasted resources can be used by any UE which tries to access to the cell and it could lead to situation where several UEs selects same PRACH resources for accessing and there will be competing situation between UEs using same resources.

It has been agreed that in NR, as in LTE/LTE-A, that UE does not need to read the SI messages broadcasted by the target node to get the common PRACH configuration, but the common PRACH configuration will be provided to UE in Handover Command together with dedicated PRACH resources (if included) during handover procedure. In LTE/LTE-A the common PRACH configuration during handover procedure is provided in cell level (the target cell has been selected by target NW node based on UE RRM measurements), but in NR (5G) the PRACH configuration can be provided in beam level. As one beam in NR could cover much smaller area than cell (there could also several Transmission Points (TRP) comprising one cell and there could several beams under one TRP) in LTE/LTE-A, several common PRACH resources need to be provided to the UE during handover procedure or one configuration should be valid for several beam/TRP/cell.

It has been previously agreed in 3GPP RAN2, that target gNB can allocate beam level dedicated RACH resources which are associated either with SS blocks (SSB) or Channel State Information Reference Signal (CSI-RS), and this dedicated RACH resource information (configuration) can be passed to UE in Handover Command (RRCConnectionReconfiguration) message (TS 36.331/TS 38.331) during the handover procedure (TS 38.300). RAN2 has also made high level agreement that UE should prioritize dedicated PRACH resources, if configured, over common PRACH resources.

To optimize the system level resource usage, it would be beneficial, if NW could direct the UE's to access via certain beams in the target node. This should be possible when dedicated PRACH resources are used i.e. NW allocates dedicated resources only from beams, it likes UE to access (beam should be viable from UE point of view also for accessing) during the handover.

As describe earlier it would be beneficial if NW could direct UE towards preferred beams e.g. for better load balancing between beams/TRPs and also to ensure expected service level from end user point of view.

Figure 2:
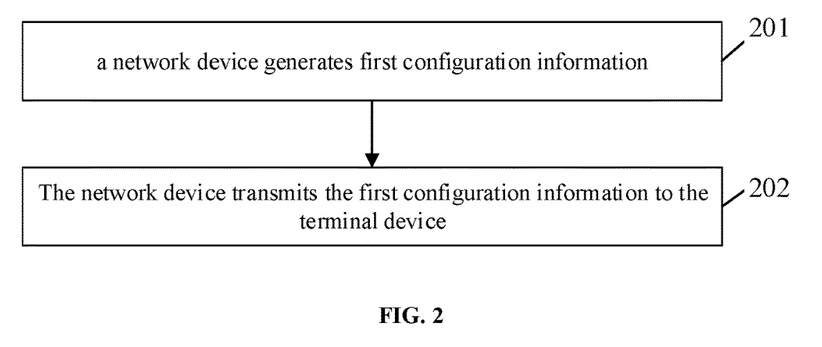
FIG. 2 illustrates a flow chart of an information indication method according to some embodiments of the disclosure.

FIG. 2 illustrates a flow chart of an information indication method according to some embodiments of the disclosure. As illustrated in FIG. 2, the information indication method includes the following operations illustrated in blocks. The method may start at block 201.

At block 201, a network device generates first configuration information. The first configuration information is adapted to configure a first physical random access channel (PRACH) resource, and includes first indication information indicative of at least one of a target beam or a target cell to be accessed by a terminal device during a random access channel (RACH) procedure initiated with a second PRACH resource.

At block 202, the network device transmits the first configuration information to the terminal device.

In the embodiments of the disclosure, the network device may be a base station, for example, a gNB in the 5G communication system, or an eNB in the 4G communication system.

In the embodiments of the disclosure, the terminal device may be a mobile phone, a tablet personal computer, a vehicle terminal, a wearable device, a notebook computer or any other device that can communicate with a network.

In an embodiment of the disclosure, during a handover procedure, the network device transmits first configuration information to the terminal device in a handover command. For example, a gNB transmits a handover command to a UE, and the handover command includes (i.e., carries) the first configuration information.

Figure 4:
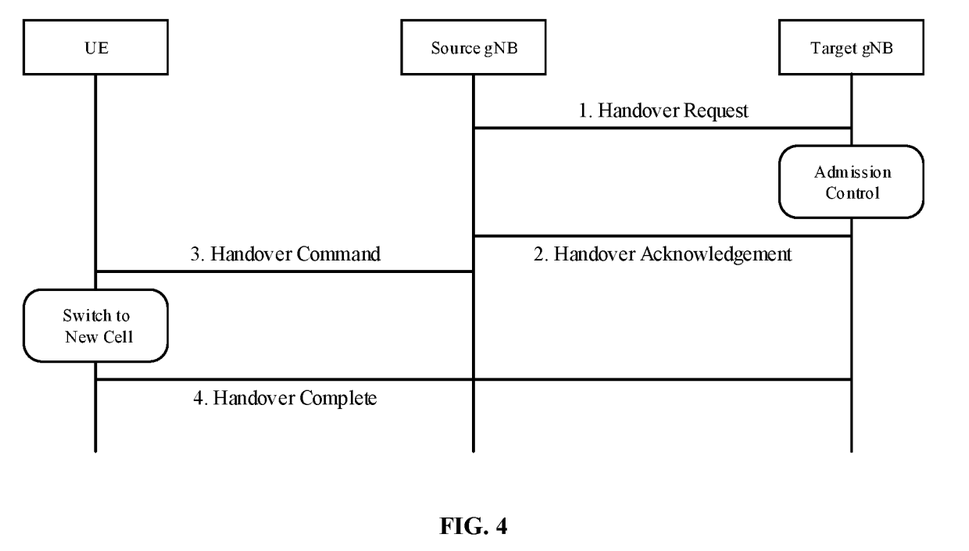
FIG. 4 illustrates a flow chart of a handover process between base stations according to some embodiments of the disclosure.

FIG. 4 illustrates a flow chart of a handover process between base stations according to some embodiments of the disclosure. After a source gNB decides to perform the handover procedure, the source gNB transmits a "Handover Request" message to a target gNB. The target gNB decides that it can be accessed by the UE and transmits a "Handover Acknowledgement" message to the source gNB. Then, the source gNB transmits a "Handover Command" to the UE. Here, the Handover Command includes the first configuration information as described in the embodiments of the disclosure. The UE may obtain the first configuration information upon reception of the Handover Command, and thus may obtain the first indication information, and determines a target beam and/or a target cell to be accessed during a random access channel (RACH) procedure initiated with a second PRACH resource based on the first indication information. Then, the UE may transmit a handover complete message to the target gNB.

In the embodiments of the disclosure, the first configuration information may be used to configure the first PRACH resource.

Further, the first PRACH resource configured by the first configuration information may be a beam-level first PRACH resource. For example, beam 1 corresponds to the first PRACH resource A, and beam 2 corresponds to the second PRACH resource B. The UE may choose to initiate the random access channel procedure with the first PRACH resource A on beam 1 or initiate the random access channel procedure with the second PRACH resource A on beam 2.

In the embodiments of the disclosure, the first configuration information includes the first indication information. The indication information is indicative of at least one of a target beam or a target cell to be accessed by a terminal device during a random access channel (RACH) procedure initiated with a second PRACH resource.

In an embodiment of the disclosure, the first PRACH resource is a dedicated PRACH resource and the second PRACH resource is a common PRACH resource. In another embodiment of the disclosure, the first PRACH resource is the common PRACH resource and the second PRACH resource is the dedicated PRACH resource.

Here, the PRACH resource may be radio resource used by a UE for initiating a random access channel procedure. The common PRACH resource may be used by any UE, while the dedicated PRACH resource may be used merely by specific UEs. If a UE is configured with both dedicated PRACH resource and common PRACH resource, the UE preferentially uses the dedicated PRACH resource for initiating the RACH procedure, and when the dedicated PRACH resource is unavailable, the UE choose to initiate the RACH procedure with the common PRACH resource.

Specifically, to make a UE aware about the preferred beams/cells over the others when using common PRACH resources, some information needs to be provided to the UE. One new solution would be to use the mechanism as will be used for dedicated PRACH resources. In the currently proposed solution for the dedicated PRACH allocation, the resources are identified with frequency, time and sequence and they are associated to certain SSB or CSI-RS. When same solution would be used to indicate the preferred target beam or cell to be accessed with common PRACH resources.

In the embodiments of the disclosure, the first configuration information may include at least one the following information of the first PRACH resource: time, frequency, or a sequence. Based on this, the network device may generate the first configuration information in one of the following two manners.

Manner 1: one or more fields for configuration of at least one of the time, the frequency, or the sequence in the first configuration information is left empty, to indicate the corresponding resource identified by at least one of the following: a target beam associated with synchronization signal and PBCH block (SSB); a target beam associated with channel state information reference signal (CSI-RS); or a target cell associated with a cell identifier (ID).

Manner 2: the first indication information is included in fields for configuration of the at least one of the time, the frequency, or the sequence in the first configuration information.

In the embodiments of the disclosure, the network device may transmit second configuration information to the terminal device. The second configuration information is adapted to configure the second PRACH resource.

Further, the network device may transmit the second configuration information to the terminal device through system information (SI).

Further, the second configuration information may include the following information of the second PRACH resource: time and frequency. Or, the second configuration information may include the following information of the second PRACH resource: a sequence, time, and frequency.

In the above embodiments, the network device may be called a NW. NW can simply let sequence, time and frequency information out and UE can determine based on that, that this beam(s) or cell(s) (identified by SSB, CSI-RS or cell ID) is used when accessing with common resources. The common PRACH resources will be provided separately with other relevant SI information in the same way as in LTE.

Another solution to identify these resources would be used the predefined preamble value in preambleIE field.

In case there is a need to provide different common PRACH resource compare to resources broadcasted by SI and passed via dedicate signaling during handover as default common PRACH resources, this solution can be enhanced to support that. The additional common PRACH configuration can be passed using the dedicated PRACH configuration indication solution, but leaving sequence information out or using predefined sequence value.

The relevant invention points how to utilize the dedicated PRACH resource signaling solution to indicate preferred beams or cells to used accessing with common PRACH resources:

1) The sequence/time/frequency part of the dedicated PRACH configuration is left empty to indicate that the resource identified by SSB, CSI-RS or cell-ID is preferred when accessing with common PRACH resources 2) Predefined values of sequence, time and/or frequency can be specified to indicate to UE that identified resources are preferred for accessing with common PRACH resources 3) Different common PRACH resources from the resources indicated by SI can passed with the same mechanism and they can be identified by following schemes a. Including only time and frequency and leaving sequence out b. Use predefined sequence with time and frequency resources According to the embodiments of the disclosure, the NW capabilities are improved, to guide to preferred beams and/or cells during the handover also when common PRACH resources are used for better load balancing between beams and cells. With this proposed mechanism, the dedicated PRACH resources indication solution can also be enhanced to use to guide UEs to preferred beams when accessing with common PRACH resources during intra-NR handover.

Using the same solution to guide UE in case of dedicated and common resources would allow more efficient usage of available signaling resources.

Figure 3:
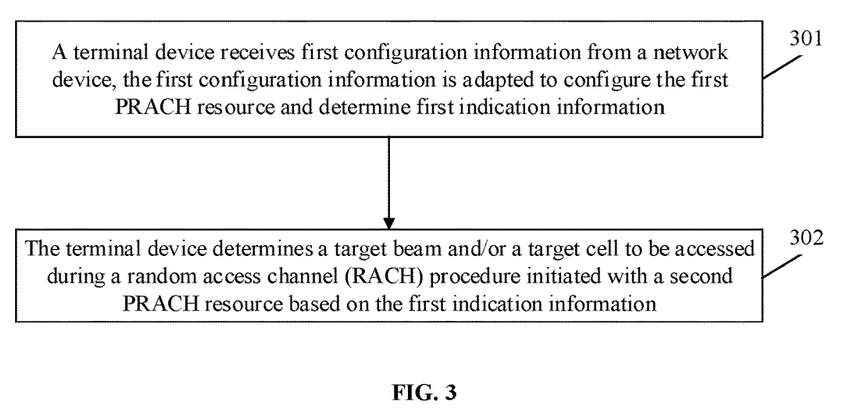
FIG. 3 illustrates a flow chart of another information indication method according to some embodiments of the disclosure.

FIG. 3 illustrates a flow chart of another information indication method according to some embodiments of the disclosure. As illustrated in FIG. 3, the information indication method includes the following operations illustrated in blocks. The method may start at block 301.

At block 301, a terminal device receives first configuration information from a network device. The first configuration information is adapted to configure a first physical random access channel (PRACH) resource, and includes first indication information;

At block 302, the terminal device determines a target beam and/or a target cell to be accessed during a random access channel (RACH) procedure initiated with a second PRACH resource, based on the first indication information.

In the embodiments of the disclosure, the network device may be a base station, for example, a gNB in the 5G communication system, or an eNB in the 4G communication system.

In the embodiments of the disclosure, the terminal device may be a mobile phone, a tablet personal computer, a vehicle terminal, a wearable device, a notebook computer or any other device that can communicate with a network.

In an embodiment of the disclosure, during a handover procedure, the terminal device receives a handover command from the network device, and the handover command includes the first configuration information. For example, a UE receives a handover command from a gNB, and the handover command includes (i.e., carries) the first configuration information.

FIG. 4 illustrates a flow chart of a handover process between base stations according to some embodiments of the disclosure. After a source gNB decides to perform the handover procedure, the source gNB transmits a "Handover Request" message to a target gNB. The target gNB decides that it can be accessed by the UE and transmits a "Handover Acknowledgement" message to the source gNB. Then, the source gNB transmits a "Handover Command" to the UE. Here, the Handover Command includes the first configuration information as described in the embodiments of the disclosure. The UE may obtain the first configuration information upon reception of the Handover Command, and thus may obtain the first indication information, and determines a target beam and/or a target cell to be accessed during a random access channel (RACH) procedure initiated with a second PRACH resource based on the first indication information. Then, the UE may transmit a handover complete message to the target gNB.

In the embodiments of the disclosure, the first configuration information may be used to configure the first PRACH resource.

Further, the first PRACH resource configured by the first configuration information may be a beam-level first PRACH resource. For example, beam 1 corresponds to the first PRACH resource A, and beam 2 corresponds to the second PRACH resource B. The UE may choose to initiate the random access channel procedure with the first PRACH resource A on beam 1 or initiate the random access channel procedure with the second PRACH resource A on beam 2.

In the embodiments of the disclosure, the first configuration information includes the first indication information. The indication information is indicative of at least one of a target beam or a target cell to be accessed by a terminal device during a random access channel (RACH) procedure initiated with a second PRACH resource.

In an embodiment of the disclosure, the first PRACH resource is a dedicated PRACH resource and the second PRACH resource is a common PRACH resource. In another embodiment of the disclosure, the first PRACH resource is the common PRACH resource and the second PRACH resource is the dedicated PRACH resource.

Here, the PRACH resource may be radio resource used by a UE for initiating a random access channel procedure. The common PRACH resource may be used by any UE, while the dedicated PRACH resource may be used merely by specific UEs. If a UE is configured with both dedicated PRACH resource and common PRACH resource, the UE preferentially uses the dedicated PRACH resource for initiating the RACH procedure, and when the dedicated PRACH resource is unavailable, the UE choose to initiate the RACH procedure with the common PRACH resource.

Specifically, to make a UE aware about the preferred beams/cells over the others when using common PRACH resources, some information needs to be provided to the UE. One new solution would be to use the mechanism as will be used for dedicated PRACH resources. In the currently proposed solution for the dedicated PRACH allocation, the resources are identified with frequency, time and sequence and they are associated to certain SSB or CSI-RS. When same solution would be used to indicate the preferred target beam or cell to be accessed with common PRACH resources.

In the embodiments of the disclosure, the first configuration information may include at least one the following information of the first PRACH resource: time, frequency, or a sequence. Based on this, the first configuration information may include the first indication information in one of the following two manners.

Manner 1: one or more fields for configuration of at least one of the time, the frequency, or the sequence in the first configuration information is left empty, to indicate the corresponding resource identified by at least one of the following: a target beam associated with synchronization signal and PBCH block (SSB); a target beam associated with channel state information reference signal (CSI-RS); or a target cell associated with a cell identifier (ID).

Manner 2: the first indication information is included in fields for configuration of the at least one of the time, the frequency, or the sequence in the first configuration information.

In the embodiments of the disclosure, the terminal device may receive second configuration information from the network device. The second configuration information is adapted to configure the second PRACH resource.

Further, the terminal device may transmit the second configuration information from the network device through system information (SI).

Further, the second configuration information may include the following information of the second PRACH resource: time and frequency. Or, the second configuration information may include the following information of the second PRACH resource: a sequence, time, and frequency.

In the above embodiments, the network device may be called a NW. NW can simply let sequence, time and frequency information out and UE can determine based on that, that this beam(s) or cell(s) (identified by SSB, CSI-RS or cell ID) is used when accessing with common resources. The common PRACH resources will be provided separately with other relevant SI information in the same way as in LTE. Another solution to identify these resources would be used the predefined preamble value in preambleIE field.

In case there is a need to provide different common PRACH resource compare to resources broadcasted by SI and passed via dedicate signaling during handover as default common PRACH resources, this solution can be enhanced to support that. The additional common PRACH configuration can be passed using the dedicated PRACH configuration indication solution, but leaving sequence information out or using predefined sequence value.

The relevant invention points how to utilize the dedicated PRACH resource signaling solution to indicate preferred beams or cells to used accessing with common PRACH resources:

1) The sequence/time/frequency part of the dedicated PRACH configuration is left empty to indicate that the resource identified by SSB, CSI-RS or cell-ID is preferred when accessing with common PRACH resources 2) Predefined values of sequence, time and/or frequency can be specified to indicate to UE that identified resources are preferred for accessing with common PRACH resources 3) Different common PRACH resources from the resources indicated by SI can passed with the same mechanism and they can be identified by following schemes a. Including only time and frequency and leaving sequence out b. Use predefined sequence with time and frequency resources According to the embodiments of the disclosure, the NW capabilities are improved, to guide to preferred beams and/or cells during the handover also when common PRACH resources are used for better load balancing between beams and cells. With this proposed mechanism, the dedicated PRACH resources indication solution can also be enhanced to use to guide UEs to preferred beams when accessing with common PRACH resources during intra-NR handover. Using the same solution to guide UE in case of dedicated and common resources would allow more efficient usage of available signaling resources.

Figure 5:
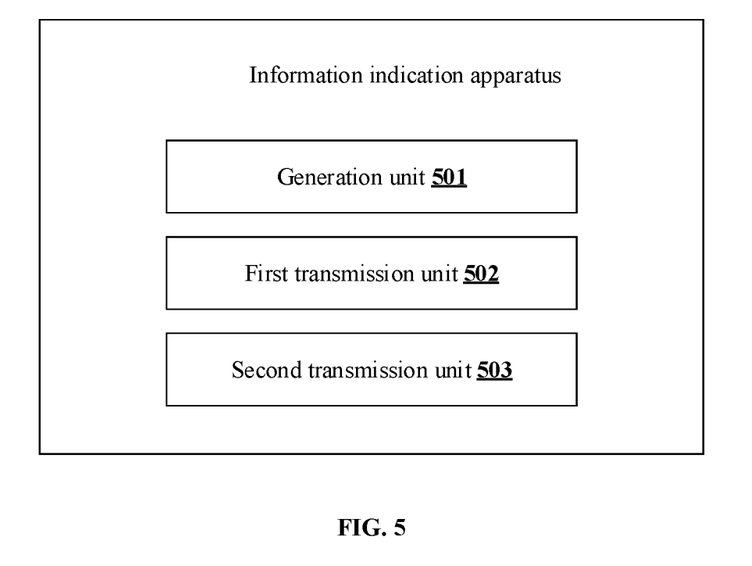
FIG. 5 illustrates a block diagram of an information indication apparatus according to some embodiments of the disclosure.

FIG. 5 illustrates a block diagram of an information indication apparatus according to some embodiments of the disclosure. As illustrated in FIG. 5, the information indication apparatus includes a generation unit 501 and a first transmission unit 502.

The generation unit 501 is configured to generate first configuration information. The first configuration information is adapted to configure a first physical random access channel (PRACH) resource, and includes first indication information indicative of at least one of a target beam or a target cell to be accessed by a terminal device during a random access channel (RACH) procedure initiated with a second PRACH resource.

The first transmission unit 502 is configured to transmit the first configuration information to the terminal device.

In an embodiment of the disclosure, the first configuration information comprises at least one the following information of the first PRACH resource: time, frequency, or a sequence. The generation unit is configured to leave one or more fields for configuration of at least one of the time, the frequency, or the sequence in the first configuration information empty, to indicate the corresponding resource identified by at least one of the following: a target beam associated with synchronization signal and PBCH block (SSB); a target beam associated with channel state information reference signal (CSI-RS); or a target cell associated with a cell identifier (ID).

In an embodiment of the disclosure, the first configuration information comprises at least one the following information of the first PRACH resources: frequency, time or a sequence. The generation unit is configured to include the first indication information in fields for configuration of the at least one of the time, the frequency, or the sequence of the first configuration information.

In an embodiment of the disclosure, the first transmission unit is configured to transmit first configuration information to the terminal device in a handover command during a handover procedure.

In an embodiment of the disclosure, the first PRACH resource configured by the first configuration information is a beam-level first PRACH resource.

In an embodiment of the disclosure, the apparatus further includes a second transmission unit 503, configured to transmit second configuration information to the terminal device, wherein second configuration information is adapted to configure the second PRACH resource.

In an embodiment of the disclosure, the second transmission unit is configured to transmit the second configuration information to the terminal device through system information (SI).

In an embodiment of the disclosure, the second configuration information includes the following information of the second PRACH resource: time and frequency. In another embodiment of the disclosure, the second configuration information includes the following information of the second PRACH resource: a sequence, time, and frequency.

In an embodiment of the disclosure, the first PRACH resource is a dedicated PRACH resource and the second PRACH resource is a common PRACH resource. In another embodiment of the disclosure, the first PRACH resource is the common PRACH resource and the second PRACH resource is the dedicated PRACH resource.

The skilled in the art shall appreciate that the descriptions related to the above information indication apparatus according to the embodiments of the disclosure may be understood in view of the descriptions related to the information indication apparatus in combination with FIG. 2 and FIG. 4.

Figure 6:
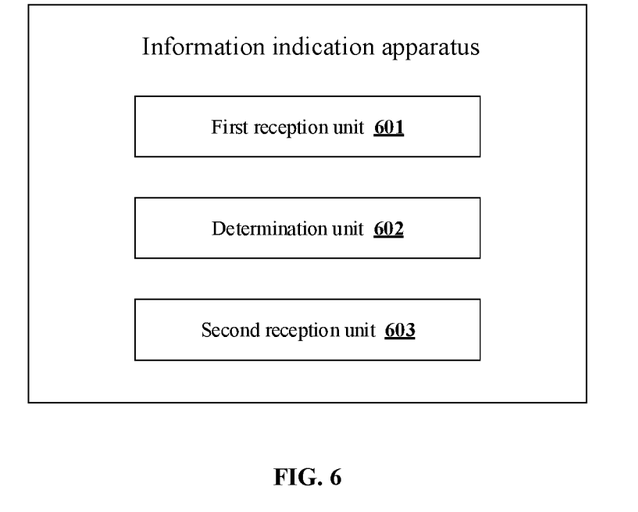
FIG. 6 illustrates a block diagram of another information indication apparatus according to some embodiments of the disclosure.

FIG. 6 illustrates a block diagram of another information indication apparatus according to some embodiments of the disclosure. As illustrated in FIG. 6, the information indication apparatus includes a first reception unit 601 and a determination unit 602.

The first reception unit 601 is configured to receive first configuration information from a network device. The first configuration information is adapted to configure a first physical random access channel (PRACH) resource, and includes first indication information; The determination unit 602 is configured to determine at least one of a target beam or a target cell to be accessed during a random access channel (RACH) procedure initiated with a second PRACH resource based on the first indication information.

In an embodiment of the disclosure, the first configuration information includes at least one the following information of the first PRACH resource: time, frequency, or a sequence. One or more fields for configuration of at least one of the time, the frequency, or the sequence in the first configuration information is left empty, to indicate the corresponding resource identified by at least one of the following: a target beam associated with synchronization signal and PBCH block (SSB); a target beam associated with channel state information reference signal (CSI-RS); or a target cell associated with a cell identifier (ID).

In an embodiment of the disclosure, the first configuration information includes at least one the following information of the first PRACH resources: frequency, time or a sequence. The first indication information is included in fields for configuration of the at least one of the time, the frequency, or the sequence of the first configuration information, and the first indication information indicates at least one of the target beam or the target cell.

In an embodiment of the disclosure, the first reception unit is configured to receive a handover command including the first configuration information during a handover procedure.

In an embodiment of the disclosure, the first PRACH resource configured by the first configuration information is a beam-level first PRACH resource.

In an embodiment of the disclosure, the apparatus further includes a second reception unit 603, configured to receive second configuration information from the network device. The second configuration information is adapted to configure the second PRACH resource.

In an embodiment of the disclosure, the second reception unit is configured to receive system information (SI) from the terminal device, the SI including the second configuration information.

In an embodiment of the disclosure, the second configuration information comprises the following information of the second PRACH resource: time and frequency. In another embodiment of the disclosure, the second configuration information comprises the following information of the second PRACH resource: a sequence, time, and frequency.

In an embodiment of the disclosure, the first PRACH resource is a dedicated PRACH resource and the second PRACH resource is a common PRACH resource. In another embodiment of the disclosure, the first PRACH resource is the common PRACH resource and the second PRACH resource is the dedicated PRACH resource.

The skilled in the art shall appreciate that the descriptions related to the above information indication apparatus according to the embodiments of the disclosure may be understood in view of the descriptions related to the information indication apparatus in combination with FIG. 3 and FIG. 4.

Figure 7:
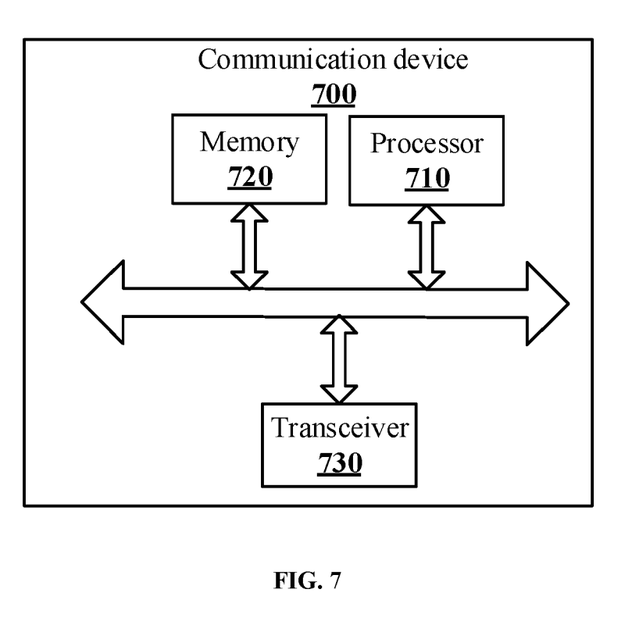
FIG. 7 illustrates a schematic block diagram of a communication device 600 according to some embodiments of the disclosure.

FIG. 7 illustrates a schematic block diagram of a communication device 700 according to some embodiments of the disclosure. The communication device 700 may be a terminal device or a network device. The communication device 700 illustrated in FIG. 7 includes a processor 710. The processor 710 calls the computer program from a memory and runs the computer program to implement one of the methods described above.

In an embodiment, the communication device 700 may include a memory 720. The processor 710 may call the computer program from the memory 720 and run the computer program to implement one of the methods described above.

The memory 720 may be a device independent from the processor 710, or may be integrated into the processor 710.

In an embodiment, the communication device 700 may include a transceiver 730. The processor 710 may communicate with other device via the transceiver 730, for example, receive information or data from other device, or send information or data to other device.

The transceiver 730 may include a transmitter and a receiver. The transceiver 730 may further include one or more antennae.

In an embodiment, the communication device 700 may be the network device as described above and configured to implement one of the processes implemented by the network device as described above. The specific processes will not be elaborated herein for simplicity.

In an embodiment, the communication device 700 may be the terminal device as described above and configured to implement one of the processes implemented by the mobile terminal/terminal device as described above. The specific processes will not be elaborated herein for simplicity.

Figure 8:
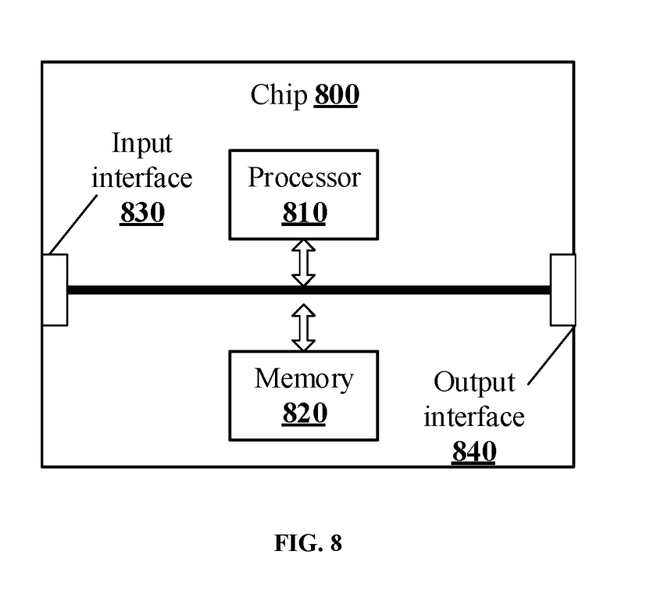
FIG. 8 illustrates a schematic block diagram of a chip according to some embodiments of the disclosure.

FIG. 8 illustrates a schematic block diagram of a chip according to some embodiments of the disclosure. The chip 800 as illustrated in FIG. 8 may include a processor 810, which may call a computer program from a memory and run the computer program to implement the methods as described above.

In an embodiment, as illustrated in FIG. 8, the chip 800 may include a memory 820. The processor 810 may call a computer program from a memory 820 and run the computer program to implement the methods as described above.

In an embodiment, the memory 820 may be a device independent from the processor 810, or may be integrated in the processor 810.

In an embodiment, the chip 800 may further include an input interface 830. The processor 810 may control the input interface 830 to perform communication with other device or chip, for example, obtain information or data from other device or chip.

In an embodiment, the chip may further include an output interface 840. The processor 810 may control the output interface 840 to perform communication with other device or chip, for example, output information or data to other device or chip.

In an embodiment, the chip may be applied to the network device as described above. The chip may implement the process performed by the network device as described above. The specific process will not be elaborated here for simplicity.

In an embodiment, the chip may be applied to the terminal device as described above. The chip may implement the process performed by the mobile terminal/terminal device as described above. The specific process will not be elaborated here for simplicity.

It is to be noted that the chip mentioned here may be called a system-level chip, a system chip, a chip system or an on-chip system chip.

Figure 9:
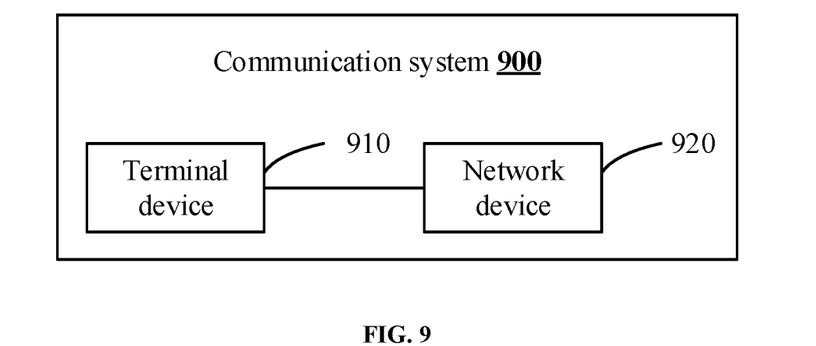
FIG. 9 illustrates a schematic block diagram of a communication system 900 according to some embodiments of the disclosure.

FIG. 9 illustrates a schematic block diagram of a communication system 900 according to some embodiments of the disclosure. As illustrated in FIG. 9, the communication system includes a terminal device 910 and a network device 920.

The terminal device 910 may be configured to implement the functions of the terminal device as described in the above methods. The network device 920 may be configured to implement the functions of the network device as described in the above methods. The specific process will not be elaborated here for simplicity.

It should be understood that, the processor mentioned here may be an integrated circuit chip having a signal processing function. The actions described in the above methods may be performed by hardware logic circuits or software instructions in the processor. The processor may be a general purpose processor, a Digital Signal Processor (DSP), an Application Specific Integrated Circuit (ASIC), a Field Programmable Gate Array (FPGA), other programmable logic devices, discrete gate, transistor logic devices, or discrete logic components, which can implement or execute the methods, operations or logic blocks disclosed in the embodiments. The general purpose processor may be a microprocessor or the processor or any conventional processor or the like. The operations of the method disclosed in the embodiments may be directly implemented by the hardware decoding processor, or may be performed by a combination of hardware and software modules in the decoding processor. The software module can be located in a conventional storage medium such as random access memory, flash memory, read only memory, programmable read only memory or electrically erasable programmable memory, register, and the like. The storage medium is located in the memory, and the processor reads the information in the memory to complete the operations of the above method in combination with the hardware.

It is to be understood that the memory in the embodiments of the present disclosure may be a volatile memory or a non-volatile memory, or may include both the volatile and non-volatile memories. The non-volatile memory may be a read-only memory (ROM), a programmable read only memory (PROM), an erasable programmable read only memory (Erasable PROM, EPROM), or an electrically erasable programmable read only memory (EEPROM) or a flash memory. The volatile memory may be a Random Access Memory (RAM) that acts as an external cache. By way of example and not limitation, many forms of RAMs are available, such as static random access memory (SRAM), Dynamic RAM (DRAM), Synchronous DRAM (SDRAM), Double Data Rate SDRAM (DDR SDRAM), Enhanced SDRAM (ESDRAM), Synchlink DRAM (SL-DRAM) and Direct Rambus RAM (DR RAM). It should be noted that the memories of the systems and methods described herein are intended to comprise, without being limited to, these and any other suitable types of memory.

It should be understood that the above-mentioned memory is exemplified but not limited.

For example, the memory in the embodiment of the disclosure may also be a static RAM (SRAM), a dynamic RAM (DRAM), or a dynamic RAM (DRAM). Synchronous DRAM (SDRAM), double data rate SDRAM (DDR SDRAM), enhanced SDRAM (ESDRAM), Synch link DRAM (SLDRAM) and Direct Rambus RAM (DR RAM) and so on. That is, the memory in the embodiments of the present disclosure is intended to include, but is not limited to, these and any other suitable types of memory.

In some embodiments of the disclosure, a computer readable storage medium is provided, storing a computer program.

The computer program may be applied to the network device in the embodiments of the disclosure and causes a processor to execute the processes performed by the network device as described above. The specific process will not be elaborated here for simplicity.

The computer program may be applied to the mobile terminal or terminal device in the embodiments of the disclosure, and causes a processor to execute the processes performed by the mobile terminal or terminal device as described above. The specific process will not be elaborated here for simplicity.

In some embodiments of the disclosure, a computer program product is provided, including computer program instructions.

The computer program instructions may be applied to the network device in the embodiments of the disclosure, and cause the processor to execute the processes performed by the network device as described above. The specific process will not be elaborated here for simplicity.

The computer program instructions may be applied to the mobile terminal or terminal device in the embodiments of the disclosure, and cause the processor to execute the processes performed by the mobile terminal or terminal device as described above. The specific process will not be elaborated here for simplicity.

In some embodiments of the disclosure, a computer program is provided.

The computer program may be applied to the network device in the embodiments of the disclosure, and which, when running in a computer, causes the computer to execute the processes performed by the network device as described above. The specific process will not be elaborated here for simplicity.

The computer program may be applied to the mobile terminal or terminal device in the embodiments of the disclosure, and which, when running in a computer, causes the computer to execute the processes performed by the mobile terminal or terminal device as described above. The specific process will not be elaborated here for simplicity.

Those of ordinary skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and module described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the modules is only logic function division, and other division manners may be adopted during practical implementation. For example, multiple modules or components may be combined or integrated into another system, or some characteristics may be neglected or not executed. In addition, coupling or direct coupling or communication connection between each displayed or discussed component may be indirect coupling or communication connection, implemented through some interfaces, of the device or the modules, and may be electrical and mechanical or adopt other forms.

The modules described as separate parts may or may not be physically separated, and parts displayed as modules may or may not be physical modules, and namely may be located in the same place, or may also be distributed to multiple network modules. Part or all of the modules may be selected to achieve the purpose of the solutions of the embodiments according to a practical requirement.

In addition, each function module in each embodiment of the disclosure may be integrated into a processing module, each module may also physically exist independently, and two or more than two modules may also be integrated into a module.

When being realized in form of software function module and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer device (which may be a personal computer, a server, network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. An information indication method, comprising:
generating, by a network device, first configuration information, wherein the first configuration information is adapted to configure a first physical random access channel (PRACH) resource, and includes first indication information indicative of a target beam to be accessed by a terminal device during a random access channel (RACH) procedure initiated with a second PRACH resource; and
transmitting, by the network device, the first configuration information to the terminal device;

wherein the first configuration information comprises at least one the following information of the first PRACH resource: time, frequency, or a sequence; and wherein generating, by the network device, first configuration information comprises:
leaving one or more fields for configuration of at least one of the time, the frequency, or the sequence in the first configuration information empty, to indicate at least one of a time resource, a frequency resource, or a sequence resource identified by at least one of the following:
a target beam associated with synchronization signal and PBCH block (SSB);
a target beam associated with channel state information reference signal (CSI-RS).

2. An information indication method, comprising:
receiving, by a terminal device, first configuration information from a network device, wherein the first configuration information is adapted to configure a first physical random access channel (PRACH) resource, and includes first indication information;
determining, by the terminal device, at least one of a target beam or a target cell to be accessed during a random access channel (RACH) procedure initiated with a second PRACH resource, based on the first indication information;
wherein the first configuration information comprises at least one the following information of the first PRACH resource: time, frequency, or a sequence; and
wherein one or more fields for configuration of at least one of the time, the frequency, or the sequence in the first configuration information is left empty, to indicate at least one of a time resource, a frequency resource, or a sequence resource identified by at least one of the following:
a target beam associated with synchronization signal and PBCH block (SSB);
a target beam associated with channel state information reference signal (CSI-RS).

3. The information indication method of claim 2, wherein the first indication information is included in fields for configuration of the at least one of the time, the frequency, or the sequence of the first configuration information, and the first indication information indicates at least one of the target beam.

4. The information indication method of claim 2, wherein receiving, by the terminal device, first configuration information from the network device comprises:
during a handover procedure, receiving, by the terminal device, a handover command comprising the first configuration information.

5. The information indication method of claim 2, wherein the first PRACH resource configured by the first configuration information is a beam-level first PRACH resource.

6. The information indication method of claim 2, further comprising:
receiving, by the terminal device, second configuration information from the network device, wherein second configuration information is adapted to configure the second PRACH resource.

7. The information indication method of claim 6, wherein receiving, by the terminal device, second configuration information from the network device comprises:
receiving, by the terminal device, system information (SI) from the network device, the SI comprising the second configuration information.

8. The information indication method of claims 6, wherein the second configuration information comprises the following information of the second PRACH resource:
time and frequency;
or,
a sequence, time, and frequency.

9. The information indication method of claim 2, wherein the first PRACH resource is a dedicated PRACH resource and the second PRACH resource is a common PRACH resource; or
wherein the first PRACH resource is the common PRACH resource and the second PRACH resource is the dedicated PRACH resource.

10. A terminal device, comprising:
a processor; and
a memory, storing a computer program, wherein the processor is configured to call and run the computer program stored in the memory to execute one or more actions comprising:
receiving first configuration information from a network device, wherein the first configuration information is adapted to configure a first physical random access channel (PRACH) resource, and includes first indication information;
determining a target beam to be accessed during a random access channel (RACH) procedure initiated with a second PRACH resource, based on the first indication information;
wherein the first configuration information comprises at least one the following information of the first PRACH resource: time, frequency, or a sequence; and
wherein one or more fields for configuration of at least one of the time, the frequency, or the sequence in the first configuration information is left empty, to indicate at least one of a time resource, a frequency resource, or a sequence resource identified by at least one of the following:
a target beam associated with synchronization signal and PBCH block (SSB);
a target beam associated with channel state information reference signal (CSI-RS).

11. The terminal device of claim 10,
wherein the first indication information is included in fields for configuration of the at least one of the time, the frequency, or the sequence of the first configuration information, and the first indication information indicates at least one of the target beam.

12. The terminal device of claim 10, wherein receiving first configuration information from the network device comprises: receiving a handover command comprising the first configuration information during a handover procedure.

13. The terminal device of claim 10, wherein the first PRACH resource configured by the first configuration information is a beam-level first PRACH resource.

14. The terminal device of claim 10, wherein the actions further comprise:
receiving second configuration information from the network device, wherein second configuration information is adapted to configure the second PRACH resource.

15. The terminal device of claim 14, wherein receiving second configuration information from the network device comprises: receiving system information (SI) from the network device, the SI comprising the second configuration information.

16. The terminal device of claim 14, wherein the second configuration information comprises the following information of the second PRACH resource:

time and frequency;

or, a sequence, time, and frequency.

17. The terminal device of claim 10, wherein the first PRACH resource is a dedicated PRACH resource and the second PRACH resource is a common PRACH resource; or wherein the first PRACH resource is the common PRACH resource and the second PRACH resource is the dedicated PRACH resource.

* * * * *